(12) United States Patent
Schneider et al.

(10) Patent No.: US 9,427,912 B2
(45) Date of Patent: Aug. 30, 2016

(54) ULTRASONIC WELDING APPARATUS HAVING PLURALITY OF SONOTRODES

(71) Applicant: Hermann Ultraschalltechnik GmbH & Co. KG, Karlsbad (DE)

(72) Inventors: Arnold Schneider, Ettlingen-Schluttenbach (DE); Gerhard Gnad, Keltern-Weiler (DE)

(73) Assignee: Herrmann Ultraschalltechnik GmbH & Co. KG, Karlsbad (DE)

( * ) Notice: Subject to any disclaimer, the term of this patent is extended or adjusted under 35 U.S.C. 154(b) by 0 days.

(21) Appl. No.: 14/782,176

(22) PCT Filed: Apr. 15, 2014

(86) PCT No.: PCT/EP2014/057635
§ 371 (c)(1),
(2) Date: Oct. 2, 2015

(87) PCT Pub. No.: WO2014/173735
PCT Pub. Date: Oct. 30, 2014

(65) Prior Publication Data
US 2016/0067912 A1  Mar. 10, 2016

(30) Foreign Application Priority Data
Apr. 25, 2013 (DE) .................. 10 2013 104 227

(51) Int. Cl.
*B32B 37/00* (2006.01)
*B29C 65/08* (2006.01)
(Continued)

(52) U.S. Cl.
CPC ....... *B29C 65/088* (2013.01); *B29C 66/53262* (2013.01); *B29C 66/53263* (2013.01);
(Continued)

(58) Field of Classification Search
CPC .................. B29C 66/53262; B29C 66/53263; B29C 66/81423; B29C 66/81469; B29C 66/9512; B29C 66/9513; B29C 65/08

USPC ................... 156/73.1, 580.1, 580.2
See application file for complete search history.

(56) References Cited

U.S. PATENT DOCUMENTS

| 6,605,178 B1 * | 8/2003 | Shinohara | ............... B29C 65/08 156/379.6 |
| 2002/0053388 A1 * | 5/2002 | Posa | .................. B01D 39/1623 156/73.1 |

(Continued)

FOREIGN PATENT DOCUMENTS

| DE | 22 51 521 A1 | 4/1974 |
| DE | 199 06 873 A1 | 8/2000 |

(Continued)

OTHER PUBLICATIONS

Jiromaru Tsujino, "Studies on Ultrasonic Plastic Welding with Two Longitudinal Vibration Systems," Japanese Journal of Applied Physics, vol. 24, No. 24, Jan. 1, 1985, pp. 172-174.

(Continued)

*Primary Examiner* — James Sells
(74) *Attorney, Agent, or Firm* — Paul & Paul

(57) ABSTRACT

The invention relates to an ultrasonic welding apparatus for ultrasonic machining of a material, having at least two sonotrodes and a converter device, which converts an electrical AC voltage into an ultrasonic vibration and sets the at least two sonotrodes in ultrasonic vibration, the at least two sonotrodes being arranged in such a manner that the material to be machined is arranged between them during machining and can at the same time be machined by the at least two sonotrodes. To specify an ultrasonic welding apparatus that allows effective material machining without an undesirable interaction occurring between the two sonotrodes, the converter device according to the invention excites the first sonotrode at a frequency $f_{s1}$ and the second sonotrode at a frequency $f_{s2}$, $f_{s2}$ being greater than $f_{s1}$.

16 Claims, 2 Drawing Sheets

(51) Int. Cl.
*B29C 65/00* (2006.01)
*B29L 31/00* (2006.01)
*B29K 101/00* (2006.01)

(52) U.S. Cl.
CPC ... *B29C66/81423* (2013.01); *B29C 66/81469* (2013.01); *B29C 66/9512* (2013.01); *B29C 66/9513* (2013.01); *B29K 2101/00* (2013.01); *B29L 2031/7128* (2013.01); *B31B 2219/603* (2013.01); *B31B 2219/9054* (2013.01)

(56) References Cited

U.S. PATENT DOCUMENTS

2013/0213580 A1* 8/2013 Thaerigen ............... B06B 3/00
156/580.2

2013/0284379 A1* 10/2013 Patrikios ............... B06B 3/00
156/580.1

FOREIGN PATENT DOCUMENTS

| | | |
|---|---|---|
| DE | 10 2009 008 129 A1 | 10/2010 |
| EP | 0 661 208 A1 | 7/1995 |
| EP | 2 263 860 A1 | 12/2010 |
| JP | S59 178215 A1 | 10/1984 |
| JP | H07 323478 A1 | 12/1995 |
| WO | 2006/038 437 A1 | 4/2006 |
| WO | 2010/145 927 A2 | 12/2010 |

OTHER PUBLICATIONS

Nora Linder, International Preliminary Report on Patentability, PCT/EP2014/057635, Oct. 29, 2015.

* cited by examiner

ULTRASONIC WELDING APPARATUS HAVING PLURALITY OF SONOTRODES

CROSS-REFERENCE TO RELATED APPLICATION

This is a national stage 371 application of International Application No. PCT/EP2014/057635, filed Apr. 15, 2014.

The present invention concerns an ultrasonic welding apparatus for ultrasonic machining of a material having at least two sonotrodes.

Ultrasound is a mechanical vibration above the audible limit. The frequency range begins at about 20 KHz and extends up to frequencies of 1 GHz. Such ultrasound frequencies are frequently produced by means of piezoelectric sound transducers (converters) from electrical energy. That mechanical vibration energy is applied to the workpiece or the material to be machined by way of the sonotrode which is connected to the converter, possibly by way of an amplitude transformation portion (also referred to as the booster).

The surface of the sonotrode which is provided to come into contact with the material to be machined is also referred to as the sealing surface. The vibration unit thus comprises a generator, converter, optionally the amplitude transformation portion and the sonotrode. For many situations of use amplitude transformer and sonotrode are in one piece.

To effectively transmit the ultrasonic vibration by means of the ultrasonic vibration unit it is necessary for the ultrasonic vibration unit to be caused to resonate. Depending on the structure of the ultrasonic vibration unit it has a plurality of natural frequencies. It is only when the converter generates a natural frequency of the ultrasonic vibration unit that resonant vibration of the ultrasonic vibration unit occurs. Therefore the converter and the ultrasonic vibration unit must be tuned to each other.

When machining materials by means of ultrasound the material to be machined is generally positioned between the sonotrode and a counterpart tool (which does not belong to the oscillation structure) and which is also referred to as the anvil. The sonotrode which is in contact with the material to be machined then transmits the ultrasound energy to the material to be machined, which is thereby for example welded or severed.

In that case energy is transmitted at the sealing surface to the material to be machined. The material to be machined is thereby also caused to vibrate so that energy transfer can also occur at the surface at which the material to be machined touches the counterpart tool.

Even if the material to be machined comprises a plurality of elements, for example is of a 2-layer structure, energy transfer also occurs in the limit region between the 1st and 2nd layers by virtue of the vibration transmitted by the sonotrode to the first layer. Particularly in the case of thicker materials which cannot be caused to vibrate by the sonotrode or which can be only insufficiently caused to vibrate however the energy transfer between the counterpart tool and material to be machined is often not sufficient for effective welding.

Therefore WO 2010/145927 has already proposed machining webs of material with two identical sonotrodes. In that case the two sonotrodes are so arranged that the material to be machined is disposed between them during the machining operation and can thus be machined simultaneously by the two sonotrodes.

In accordance with the known machining process however the two sonotrodes are energized with exactly the same ultrasound frequency, which can lead to unwanted influencing of the one sonotrode by the other and vice-versa.

EP 2 263 860 A1 discloses an ultrasonic sealing iaw, an apparatus and a method of sealing plastic film portions. The sealing iaw has a concave portion and a flat portion. Two such sealing jaws can be arranged in mutually opposite relationship to weld a plastic film in a tubular shape.

JP S59 178215 A discloses an ultrasonic welding apparatus in which two sealing laws are arranged in mutually opposite relationship.

EP 0 661 208 A1 and JP H07 323478 belong to a patent family and concern a method of and an apparatus for producing a stand-up bag provided with a filling connection, the filling connection being hot-welded to the bag.

The article "Studies on Ultrasonic Plastic Welding with Two Longitudinal Vibrations Systems" by Jiromaru Tsuiino, Japanese Journal of Applied Physics, 24(1985), discloses an ultrasonic welding apparatus, using two sonotrodes with 20 kHz on the one hand and 27 kHz on the other hand.

Therefore, taking the described state of the art as the basic starting point, the object of the present invention is to provide an ultrasonic welding apparatus which allows effective material machining without involving an unwanted interaction between the two sonotrodes.

According to the invention that object is attained in that the at least two sonotrodes are so constructed that the first sonotrode can be excited with a natural frequency $f_{s1}$ and the second sonotrode can be excited with a natural frequency $f_{s2}$, wherein $f_{s2}$ is greater than $f_{s1}$, wherein there is provided at least one third sonotrode, wherein the third sonotrode is so arranged that the material to be machined is positioned during the machining operation between at least one sonotrode on the one hand and at least two sonotrodes on the other hand, and wherein the total surface area of the sonotrode positioned on one side of the material to be machined approximately corresponds to the total surface area of the sonotrodes positioned on the other side of the material to be machined. Therefore the two sonotrodes should also each have a correspondingly designed converter which provides the respective natural frequency. In other words, in operation the one sonotrode is caused to perform an ultrasonic vibration $f_{s1}$ and the other sonotrode is caused to perform an ultrasonic vibration $f_{s2}$.

If now during machining of the material it happens that the ultrasonic vibration of the one sonotrode is transmitted by way of the material to the other sonotrode that does not there meet a matching natural frequency so that the first sonotrode has practically no influence on the vibration behaviour of the second sonotrode.

Desirably the sonotrode is so constructed that $f_{s2}$ is not an integral multiple of $f_{s1}$. If more specifically the natural frequency of the second sonotrode were an integral multiple of the natural frequency of the first sonotrode then that could entail excitation of higher harmonic vibrations and that could involve an adverse influence as between the two sonotrodes.

In practice it has been found that it is best for $$\frac{f_{s2} - f_{s1}}{f_{s1}} \leq 0.4$$

and preferably $$\frac{f_{s2} - f_{s1}}{f_{s1}} \leq 0.2.$$

For example the first sonotrode could be excited at a frequency $f_{s1}$ of 30 kHz while the second sonotrode is excited at a frequency $f_{s2}$ of 35 kHz. The 30 kHz vibration is sufficiently far away from the 35 kHz natural frequency of the second sonotrode so that there is almost no energy transfer between the first sonotrode on the one hand and the second sonotrode on the other hand.

By virtue of the different vibration frequencies the ultrasonic machining operation can be markedly improved as now the vibration amplitude of a sonotrode can be set without that having an influence on the vibration amplitude of the other sonotrode.

In a further particularly preferred embodiment it is provided that the at least two sonotrodes respectively have at least one flat sealing surface portion.

In a preferred embodiment the sonotrodes are reciprocable relative to each other between an open position in which the two sealing surfaces are arranged spaced far from each other and in which the material to be machined can be further transported and a closed position in which the two sealing surfaces are arranged close to each other and in which the material to be machined is machined.

In many situations of use however it is necessary for items like for example a pouring device (spout) to be welded into the material webs. In that case the sealing surface can have appropriate openings.

Particularly when welding spouts into for example drinks packs at least one sonotrode, preferably both sonotrodes, have at least one curved, preferably concavely curved, sealing surface portion. When machining the material the item to be welded in place, for example the spout, is then fitted into the concavely curved sealing surface portion.

In a further preferred embodiment at least one sonotrode and preferably at least two sonotrodes has two flat sealing surface portions and a curved sealing surface portion between the two sealing surface portions.

In a further preferred embodiment there are provided at least three sonotrodes, wherein the sonotrodes are so arranged that the material to be machined is positioned between at least one sonotrode on the one hand and at least two sonotrodes on the other hand during the machining operation, wherein preferably the total surface area of the sonotrode positioned on one side of the material to be machined approximately corresponds to the total surface area of the sonotrodes positioned on the other side of the material to be machined.

In that respect it is desirable if the sonotrodes positioned on the same side of the material to be machined have mutually spaced sealing surfaces.

It may also be advantageous if the number of sonotrodes positioned on one side of the material to be machined differs from the number of sonotrodes positioned on the other side of the material to be machined.

Further advantages, features and possible uses of the present invention will be apparent from the following description of a preferred embodiment and the accompanying Figures in which.

Figure 1:
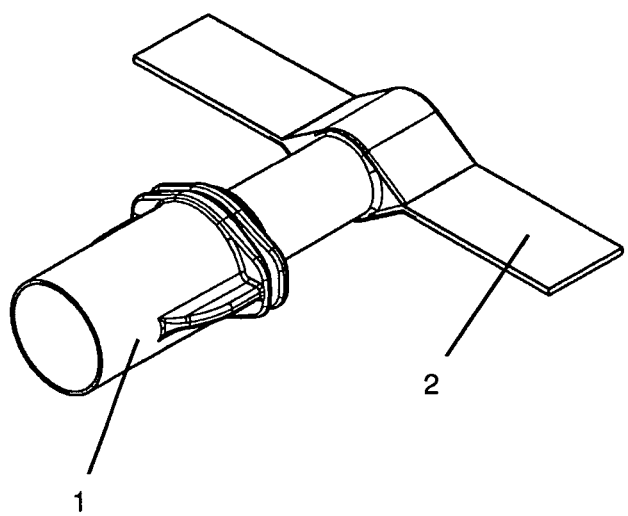
FIG. 1 shows a perspective view of a spout inserted between two material webs.
Figure 2:
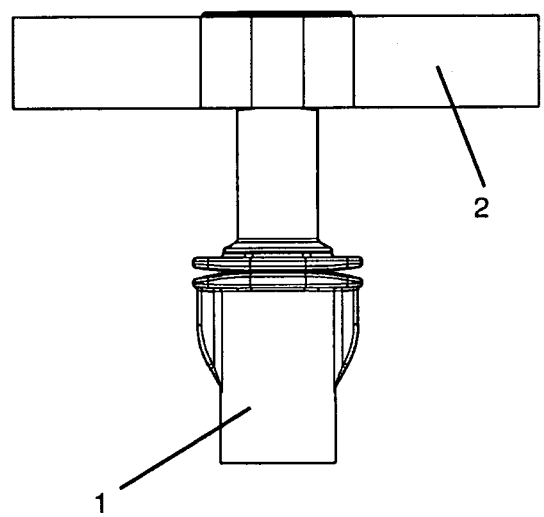
FIG. 2 shows a view from above of the arrangement of FIG. 1.
Figure 3:
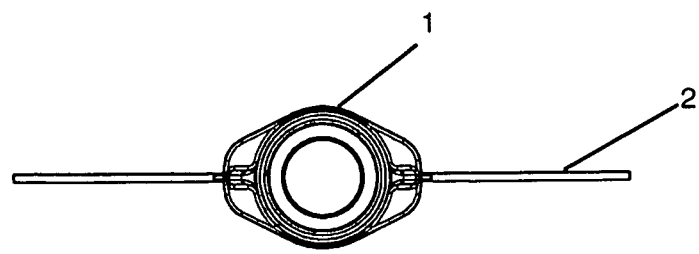
FIG. 3 shows a view from the front of the arrangement of FIG. 1.

FIGS. 1 through 3 diagrammatically show a spout 1 between two material webs 2. In particular drinks but also washing agents are frequently sold in plastic bags into which a pouring device, a so-called spout, is welded. That welding operation can be effected for example by means of an ultrasonic welding apparatus.

Figure 6:
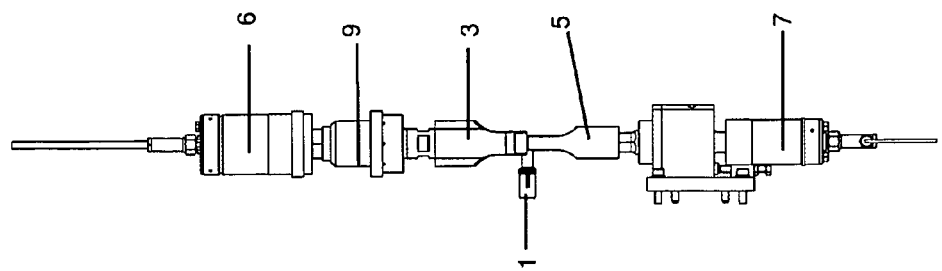
FIG. 6 shows a side view of the embodiment of FIG. 4.
Figure 5:
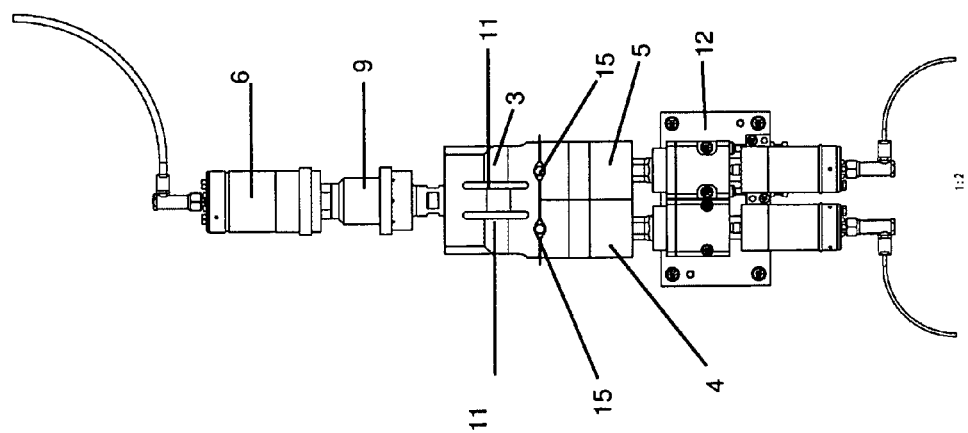
FIG. 5 shows a plan view of the embodiment of FIG. 4.
Figure 4:
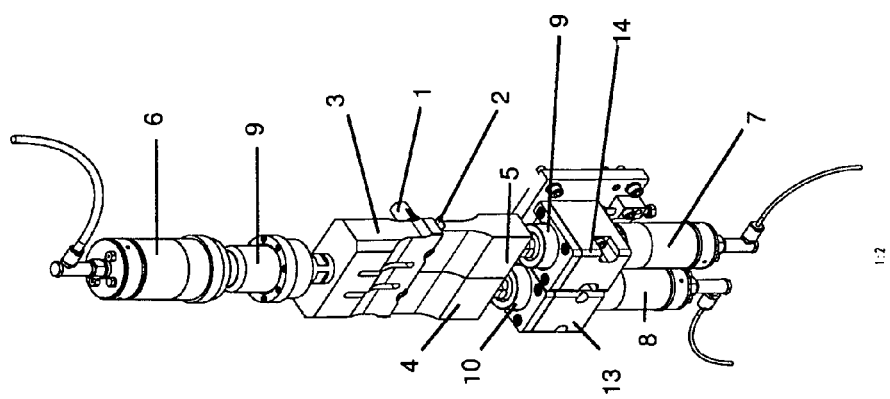
FIG. 4 shows a perspective view of an embodiment according to the invention.

An embodiment according to the invention is shown in FIGS. 4 through 6. FIG. 4 shows a perspective view of the ultrasonic welding apparatus, FIG. 5 shows a front view and FIG. 6 shows a side view.

The ultrasonic welding apparatus has a total of three sonotrodes 3, 4, 5. A sonotrode 3 is connected by way of an amplitude transformer 9 to a converter 6. The converter 6 converts an electrical AC voltage into a mechanical ultrasonic vibration. It usually has piezoelectric crystals for that purpose.

The amplitude transformer 9 which is not absolutely necessary converts the amplitude of the ultrasonic vibration, but not the frequency. The sonotrode 3 can thus be caused to vibrate with a natural vibration by the converter 6. The sonotrode 3 has two slots 11 which reduce material deformation within the sonotrode during the ultrasonic vibration.

The other two sonotrodes 4 and 5 are respectively connected to a converter 7, 8 by way of an amplitude transformer 9, 10. Each of the two sonotrodes 4, 5 can thus be caused to perform an ultrasonic natural vibration by means of one of the converters 7, 8. The two sonotrodes 4, 5 have a natural frequency which is excited with the converters 7, 8, that differs from the natural frequency of the sonotrode 3.

The two sonotrodes 4, 5 are connected to a fixing plate 12 by means of the holders 13, 14. The sonotrodes 4, 5 are thus immobile—apart from the vibration.

The sonotrode 3 in contrast can be reciprocated relative to the sonotrodes 4, 5 between an opened position (not shown) and a closed or machining position as shown in FIGS. 4 through 6. Both the sonotrode 3 and also the sonotrodes 4, 5 have both flat sealing surface portions and also concavely curved sealing surface portions. They are so arranged that, in the machining position shown in FIGS. 4 through 6, formed between the sonotrodes 3 and 4, and 3 and 5 respectively, is a respective passage 15, the contour of which substantially corresponds to the contour of the spout 1.

In the opened position therefore a material web with two spouts can be fitted to the concave sealing surface portions of the sonotrodes 4, 5 so that the material web 2 can be welded to the spouts 1 in the subsequent machining position.

The use of two sonotrodes which are operated at different vibration frequencies makes it possible to implement effective welding between the material web 2 and the spouts 1.

LIST OF REFERENCES 1 spout
2 material webs
3, 4, 5 sonotrode
6, 7, 8 converter
9, 10 amplitude transformer
11 slots
12 fixing plate
13, 14 holder
15 passage

The invention claimed is:

1. An ultrasonic welding apparatus for ultrasonic machining of a material comprising at least two sonotrodes (3, 4) and a converter device (6, 7, 8) which converts an electrical AC voltage into an ultrasonic vibration and causes the at least two sonotrodes (3, 4) to perform ultrasonic vibration, wherein the at least two sonotrodes (3, 4) are so arranged that the material to be machined is disposed between them during the machining operation and can be machined at the same time by the at least two sonotrodes (3, 4), wherein the converter device (6, 7, 8) excites the first sonotrode at a frequency $f_{s1}$ and the second sonotrode at a frequency $f_{s2}$, wherein $f_{s2}$ is greater than $f_{s1}$, characterised in that there is provided at least one third sonotrode (5), wherein the third sonotrode (5) is so arranged that the material to be machined is positioned between at least one sonotrode (3) on the one hand and at least two sonotrodes (4, 5) on the other hand during the machining operation and wherein preferably the total surface area of the sonotrode (3) positioned on one side of the material to be machined approximately corresponds to the total surface area of the sonotrodes (4, 5) positioned on the other side of the material to be machined.

2. An ultrasonic welding apparatus as set forth in claim 1 characterised in that $f_{s2}$ is not an integral multiple of $f_{s1}$.

3. An ultrasonic welding apparatus as set forth in claim 1 characterised in that $$\frac{f_{S2} - f_{S1}}{f_{S1}} \leq 0.4$$

and preferably $$\frac{f_{S2} - f_{S1}}{f_{S1}} \leq 0.2.$$

4. An ultrasonic welding apparatus as set forth in claim 1 characterised in that the at least two sonotrodes respectively have at least one flat sealing surface portion.

5. An ultrasonic welding apparatus as set forth in claim 1 characterised in that at least one sonotrode, preferably two sonotrodes, has at least one curved, preferably concavely curved sealing surface portion.

6. An ultrasonic welding apparatus as set forth in claim 5 characterized in that at least one sonotrode has two flat sealing surface portions and a curved sealing surface portion arranged between the two sealing surface portions.

7. An ultrasonic welding apparatus as set forth in claim 1 characterised in that the sonotrodes positioned on the same side of the material to be machined have mutually spaced sealing surfaces.

8. An ultrasonic welding apparatus as set forth in claim 2 characterised in that $$\frac{f_{S2} - f_{S1}}{f_{S1}} \leq 0.4$$

and preferably $$\frac{f_{S2} - f_{S1}}{f_{S1}} \leq 0.2.$$

9. An ultrasonic welding apparatus as set forth in claim 2 characterised in that the at least two sonotrodes respectively have at least one flat sealing surface portion.

10. An ultrasonic welding apparatus as set forth in claim 3 characterised in that the at least two sonotrodes respectively have at least one flat sealing surface portion.

11. An ultrasonic welding apparatus as set forth in claim 1 characterised in that at least one sonotrode has at least one concavely curved sealing surface portion.

12. An ultrasonic welding apparatus as set forth in claim 1 characterised in that at least two sonotrodes each have at least one concavely curved sealing surface portion.

13. An ultrasonic welding apparatus as set forth in claim 2 characterised in that at least one sonotrode has at least one curved sealing surface portion.

14. An ultrasonic welding apparatus as set forth in claim 2 characterised in that at least one sonotrode has at least one concavely curved sealing surface portion.

15. An ultrasonic welding apparatus as set forth in claim 5 characterised in that at least two sonotrodes each have two flat sealing surface portions and a curved sealing surface portion arranged between the two sealing surface portions.

16. An ultrasonic welding apparatus as set forth in claim 5 characterised in that at least two sonotrodes each have two flat sealing surface portions and a concavely curved sealing surface portion arranged between the two sealing surface portions.

\* \* \* \* \*